| United States Patent [19] | [11] | 4,323,122 |
|---|---|---|
| Knopik | [45] | Apr. 6, 1982 |

[54] PROCESS FOR RECOVERING ORGANIC LIQUIDS FROM UNDERGROUND AREAS

[76] Inventor: Dwayne L. Knopik, P.O. Box 33427, St. Paul, Minn. 55133

[21] Appl. No.: 155,307

[22] Filed: Jun. 2, 1980

[51] Int. Cl.³ .................. E21B 43/00; E21B 43/34
[52] U.S. Cl. .................. 166/267; 166/75 R; 166/205; 166/369
[58] Field of Search .......... 166/56, 75 R, 157, 158, 166/205, 265, 267, 314

[56] References Cited

U.S. PATENT DOCUMENTS

| 260,803 | 7/1882 | Tichenor | 166/314 X |
|---|---|---|---|
| 746,096 | 12/1903 | Karsch | 166/157 X |
| 1,602,190 | 10/1926 | Eddy et al. | 166/314 X |
| 2,624,410 | 1/1953 | Nixon | 166/75 |
| 2,927,640 | 3/1960 | Kenneday | 166/205 X |
| 3,234,879 | 2/1966 | Brown | 166/75 |
| 3,930,538 | 1/1976 | Brennan et al. | 166/205 |
| 3,980,138 | 9/1976 | Knopik | 166/314 |
| 4,014,387 | 3/1977 | Fink | 166/314 |
| 4,183,407 | 1/1980 | Knopik | 166/314 |

*Primary Examiner*—James A. Leppink
*Assistant Examiner*—George A. Suchfield
*Attorney, Agent, or Firm*—Richard Francis

[57] ABSTRACT

The invention provides a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit and an exhaust means for creating less than atmospheric pressure in the vessel. The collection head has a liquid impermeable end portion and a liquid permeable intermediate portion for permitting the passage of liquid.

The process comprises providing an opening in the ground to a point beneath the surface of the water table, positioning the conduit with the collection head in place so that the liquid permeable wall of the collection head is just above the surface of the water table, connecting the conduit to the collection vessel intake and exhausting air and other gaseous materials from the vessel to cause liquid to flow into the collection head through the conduit into the vessel.

2 Claims, 2 Drawing Figures

PROCESS FOR RECOVERING ORGANIC LIQUIDS FROM UNDERGROUND AREAS

DESCRIPTION

1. Technical Field

The present invention relates to a system and process for recovering organic liquid such as gasoline from underground areas.

2. Background Art

Various techniques are known in the art for removing or recovering underground contaminant organic liquids and/or vapors. Such organic liquids include gasoline and other normally liquid volatile petroleum products which frequently escape from surface and underground storage tanks because of the development of leaks in the tank walls or transfer lines or because of negligent handling, e.g., because of overfilling. Once on or in the ground, such organic liquids typically saturate the soil and progress downward until they reach the water table whereon they collect as a difficult to remove layer.

Merely placing a conduit with an open end through an opening in the ground and into the layer of organic liquid and pumping on the other end of the conduit is extremely dangerous since it results in the introduction of the organic liquids, which are extremely combustible materials, and air in the pump, creating a potentially explosive situation. Even without the danger of explosion, such a system is not particularly efficient.

A particularly safe and efficient device for recovering liquid contaminants is described in my U.S. Pat. No. 3,980,138 entitled "Underground Fluid Recovery Device" which issued Sept. 14, 1976. The device described in that patent provides for large scale recovery of liquid and vaporized underground contaminants (e.g., gasoline) from subterranean areas. The device described in that patent, however, employs a stream of compressed gas such as air to pass through a venturi and thereby creates less than atmospheric pressure in a conduit which is directed into the contaminated area to cause the contaminants to be lifted through the conduit, mixed with the air stream and expelled into a storage tank or into the atmosphere. While this device is relatively effective in removing such organic liquid contaminants, it is somewhat impractical because it requires the recovery of the recovered contaminant material from relatively large quantities of air and, if care is not taken, it may cause some contamination of the atmosphere, if recovery is not complete.

Additionally, a particularly effective device for removing underground contaminant vapors is described in my U.S. Pat. No. 4,183,407, issued Jan. 15, 1980. While that device is particularly useful for removing contaminant vapors, it is not intended to be employed to remove liquids.

There exists a need for an effective system for recovering organic liquids which provides a relatively safe means of removal of the contaminant liquids substantially without danger of polluting the atmosphere.

DISCLOSURE OF INVENTION

The present invention provides a system and process for recovering organic liquids such as gasoline which have settled on the water table in underground areas. Briefly, the system comprises a conduit extending from above the surface of the ground and to a point below the ground slightly above the water table, fitted at the lower end of the conduit a collection head having a liquid-permeable portion positionable into the water table, and a collection vessel having an inlet connected to the upper end of the conduit and a vapor outlet connected to an exhaust means capable of creating less than atmospheric pressure in said vessel sufficient to draw liquid into the collection head, through the conduit and into the vessel. The preferred exhaust means is a vacuum pump and, most preferably, the system includes a trap capable of substantially removing gaseous organic materials from the vapor exhausted from the vessel and permitting the passage of air.

The process of the invention comprises first providing an opening in the ground from the ground surface to a point beneath the upper surface of the water table. The conduit having the collection head fitted on one end is then positioned within the opening so that the liquid permeable wall portion of the collection head is just above the surface of the water table and the liquid impermeable lower end portion of the collection head is just below the surface of the water table. The upper end of the conduit is then connected to the collection vessel and air and other gaseous materials are exhausted from the vessel by the exhaust means to create less than atmospheric pressure in the vessel. The pressure created in the vessel is such that liquids adjacent the outside of the liquid-permeable portion of the collection head will be drawn into the collection head and through the conduit into the vessel.

The collection head preferably is characterized by having walls which define an inner chamber, a closed liquid-impermeable lower end which is positionable into the water table, an open upper end portion which may be fitted in fluid-tight relationship to the lower end of the conduit, and a liquid-permeable portion intermediate the liquid-impermeable lower end portion and the open upper end. In the process, the level of the organic material is ascertained by lowering the collection head below the water table until only water is drawn into the liquid permeable portion of the collection head. Once water recovery is observed, the collection head is raised until the liquid being recovered is substantially completely organic material lying on the top of the water table. Recovery is continued until substantially no indications of liquid organic material recovery can be noted.

The employment of the collection vessel provides a safety feature which is not present in systems employing a pump directly connected to the upper end of the conduit. The collection vessel is evacuated to cause the liquid being recovered to flow therein and only vapors are removed from the vessel by the pump, thereby avoiding pumping highly combustible organic liquids and reducing the danger of inadvertent combustion within the pump.

The liquid impermeable lower end of the preferred collection head provides a significant part of the system for locating the relative position of the water table and the layer of organic liquids thereon. The lower end of the collection head is disposed beneath the surface of the water table to first permit recovery of mainly water and then, as the collection head is raised, the recovery of liquid organic materials. The lower impermeable end portion of the collection head provides a probe which may penetrate the earth at the bottom of the boring, permitting placement of the collection head, without endangering the more fragile liquid permeable portion as the placement of the collection head is accomplished.

The liquid permeable portion of the collection head is typically formed of a screen which may be susceptible to damage by sharp objects sometimes found within the boring.

BEST MODE FOR CARRYING OUT THE INVENTION

Figure 1:
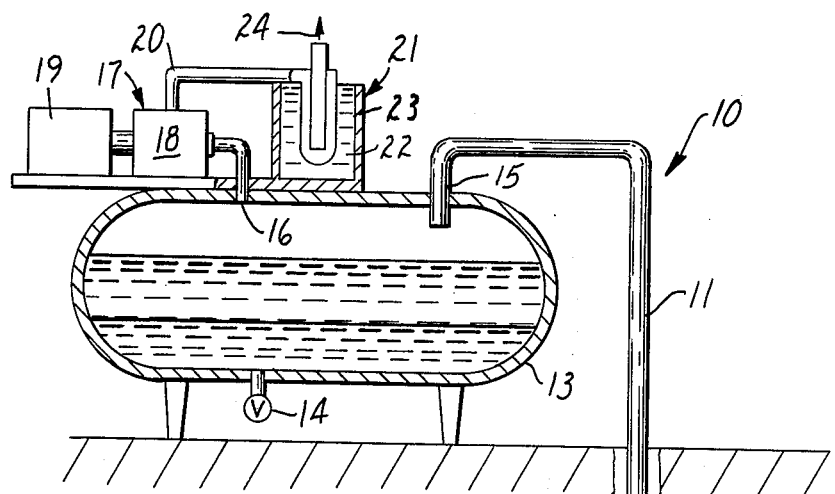
FIG. 1 is a cross sectional view in elevation of the preferred embodiment of the system of the present invention.

Referring now to the drawing and with specific reference to FIG. 1, there is shown a system 10 that represents a preferred embodiment of my present invention that is particularly adapted for recovering organic liquids such as gasoline from underground areas. System 10 comprises pipe 11 which provides a conduit that extends from the ground surface through a boring through the soil to provide an opening or bore 29 which extends below the surface 41 of the water table. Pipe 11 is positioned with its lower end at least reaching a point slightly above water table surface 41. Quantities of gasoline in the soil, when sufficient, will settle on surface 41 as gasoline layer 42.

Collection head 12 includes liquid impermeable lower end portion 25, open end portion 26 characterized by having opening 27 capable of being positioned into fluidtight relationship with the lower end of pipe 11 and a liquid permeable intermediate portion 28. Upper end of pipe 11 is connected to a liquid inlet 15 of collection vessel 13. A vacuum pump 18 driven by a suitable power supply such as electric motor 19 provides an exhaust means 17 for drawing vapors from vapor outlet 16 of vessel 13 and expelling such vapors through exhaust line 20 preferably through a collection means such as a cold trap 21 and out exhaust port 24 into the atmosphere. Cold trap 21 includes a cooling device, e.g., coolant liquid 22 in vessel 23, which is capable of removing gaseous organic vapor from the exhaust line, preferably condensing the same as liquid or solid organic material, and permitting the passage of air.

Vessel 13 preferably is fitted with a suitable closeable drain 14 capable of being opened to substantially drain the vessel contents once normal atmospheric pressure is established, e.g., after filling vessel 13. The pipe connection connecting the upper end of pipe 11 to vessel 13 preferably is fitted with a means for detecting the passage of water and gasoline such that collection head 12 may be raised or lowered to optimize the recovery of gasoline. For this purpose, it is sufficient to have a transparent portion in the connecting lines provided for example by a transparent plastic tube which readily permits the operator to visually distinguish water from gasoline.

The exhaust means should be sufficient to reduce the pressure in vessel 13 to approximately 0.25 to 0.75 atmosphere, preferably 0.50 to 0.75 atmosphere. It should be understood that lower atmosphere pressures in vessel 13 will be required at greater recovery depths and similarly, pressures only slightly under atmospheric pressure will be sufficient for relatively shallow recovery depths.

The means for creating less than atmospheric pressure in collection vessel 13 preferably is a vacuum pump driven by a suitable motor, as previously mentioned. A preferred vacuum pump is provided by a Person 135 cubic feet per minute Model M-3 vacuum pump or a similar pump which may be of a larger capacity and is driven by suitable power source such as an electric or gasoline engine, e.g., a 21 horse power two cycle gasoline engine to provide the desired reduction in pressure in vessel 13.

A suitable collection vessel may be provided by a 250 gallon liquid propane tank. Suitable vessels will resist collapse at the reduced pressures which are applied as described herein and will be capable of maintaining the imposed reduction in pressure for sufficient times to permit removal of the liquid contaminants. The collection vessel is preferably fitted with a vacuum gauge such as that available from Marshalltown Instruments as No. 45K having a vacuum scale in inches of mercury from 0–30 representing one atmosphere to zero atmosphere pressure. Typical vacuum readings with this gauge when used in the system of the invention will be on the order of 10–12 inches representing about 0.3 atmosphere.

Pipe 11 preferably has a diameter on the order of $\frac{1}{2}$ inch to 3 inches and will have a wall thickness sufficient to withstand damage and severe deformation under the usage conditions herein described. Pipe 11 is preferably formed of a rigid material such as black iron or galvanized pipe. The preferred diameter of pipe 11 is $\frac{3}{4}$ inch.

The collection head, as previously discussed, provides an integral part of the system of the present invention. The collection head preferably includes a water impermeable probe portion and has an intermediate liquid permeable portion. The collection head preferably is made of a rigid material such as steel or iron and may be of the same diameter as pipe 11. The liquid permeable portion of the collection head is preferably provided by a screen or other perforate element. The pore size of the liquid permeable portion of the collection head will vary, depending upon the type of soil, with larger pore sizes being permitted with coarser soils and finer pore sizes being required for finer soils to prevent the inclusion of substantial quantities of soil into the system. The preferred liquid permeable portions are formed of 60 to 90 gauge screen material. The preferred liquid permeable portion of the collection head is approximately 1 to 16 inches in length, preferably 4 to 8 inches in length. Useful collection heads may be formed of well screen elements which have been closed and filled on their lower end portion to form a liquid impermeable portion with filler materials such as curable resins, solder, or other suitable materials. Such well screens are commercially available.

Figure 2:
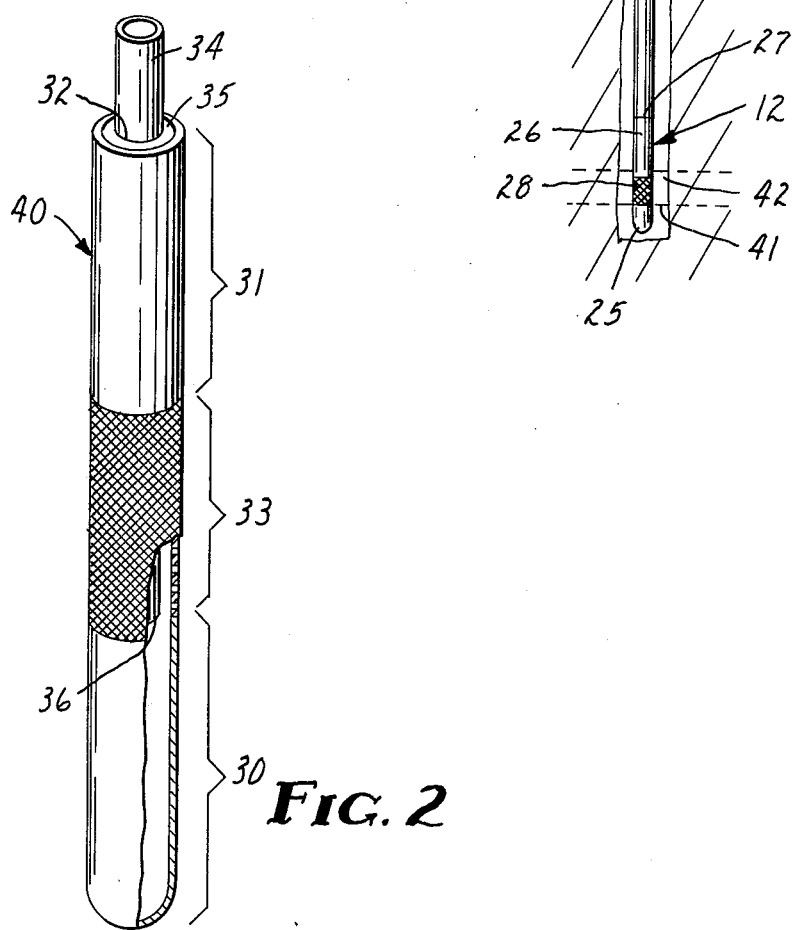
FIG. 2 is a partial cross sectional perspective enlarged view of another embodiment of the collection head of the system of the present invention.

FIG. 2 shows a preferred collection head 40 formed of an open-ended tubular section of well screen, e.g., about 12 inches in length and $1\frac{1}{4}$ inch in diameter, which has been modified to provide a liquid impermeable lower portion 30 by closing one end of the screen with solder or by welding and an upper portion 31 which may also be filled to be liquid impermeable and has an open end 32 for connection to the lower end of pipe 11 and an intermediate perforate portion 33 to permit passage of liquid. Preferably, a section of conduit 34, most preferably the same diameter of pipe 11, is fastened in fluid-tight relationship in opening 32 with an appropriate ring seal 35 provided by solder, a weld or other suitable pipe connection, with the lower end 36 of conduit section 34 aligned near the lower end of perforate portion 33 to facilitate recovery of even very thin layers of gasoline.

Preferably, before the vacuum pump is started, the soil removed from bore 29 should be partially refilled to form a substantially tight barrier around pipe 11 to prevent substantial quantities of air from being drawn into the collection head. Other sealing means may be possible such as by use of a sealing collar.

Preferably, the line connecting the upper end of pipe 11 to vessel 13 includes a means for observing the liquid passing therethrough. For this purpose, it is sufficient for a portion of the line to be transparent or translucent, permitting the user to observe the color and the nature of the liquid passing therethrough. This provides an aid to the user to position the liquid permeable portion of collection head 12 into gasoline layer 42.

Other modifications are contemplated without departing from the scope of the claims.

I claim:

1. A process for recovering organic liquids such as gasoline from the surface of the water table in underground areas, said process comprising the following steps;
    (1) providing an opening in the ground from the ground surface to a point beneath the upper surface of the water table;
    (2) positioning within said opening a conduit having a lower end in fluid-tight relationship with a collection head having a closed liquid impermeable lower end portion, an open upper end fitted onto the lower end of said conduit, and a liquid permeable wall portion intermediate said liquid impermeable lower end portion and said upper end;
    (3) positioning said collection head so that the liquid permeable wall portion is just above the surface of the water table and the liquid impermeable lower end portion of said collection head is just below the surface of the water table;
    (4) connecting the upper end of said conduit to an inlet of a collection vessel having a vapor outlet to permit the removal of air and other gaseous materials but not substantial amounts of liquid from said vessel; and
    (5) exhausting air and other gaseous materials from said vessel through said vapor outlet to create less than atmospheric pressure in said vessel whereby to draw organic liquids from the surface of the water table through said conduit into said vessel.

2. The process of claim 1 also including the step of removing gaseous organic vapors from the materials exhausted from said vessel.

* * * * *

UNITED STATES PATENT AND TRADEMARK OFFICE
CERTIFICATE OF CORRECTION

PATENT NO. : 4,323,122
DATED : April 6, 1982
INVENTOR(S) : Duane L. Knopik

It is certified that error appears in the above—identified patent and that said Letters Patent is hereby corrected as shown below:

In the Title Page:

[76] "Dwayne" should read -- Duane --.

Signed and Sealed this

Nineteenth Day of October 1982

|SEAL|

Attest:

GERALD J. MOSSINGHOFF

Attesting Officer

Commissioner of Patents and Trademarks